United States Patent [19]
Takamizawa et al.

[11] Patent Number: 4,657,991
[45] Date of Patent: Apr. 14, 1987

[54] PRECURSOR COMPOSITION OF SILICON CARBIDE

[75] Inventors: Minoru Takamizawa; Taishi Kobayashi; Toshinobu Ishihara; Yoshihumi Takeda; Akira Hayashida, all of Niigata, Japan

[73] Assignee: Shin-Etsu Chemical Co., Ltd., Tokyo, Japan

[21] Appl. No.: 787,328

[22] Filed: Oct. 15, 1985

[30] Foreign Application Priority Data

Oct. 17, 1984 [JP] Japan ................... 59-218140

[51] Int. Cl.$^4$ ............................................. C08F 283/00
[52] U.S. Cl. ........................................ 525/477; 528/33; 528/35; 528/39; 524/267
[58] Field of Search .................... 528/33, 35, 39; 525/477; 524/267

[56] References Cited

U.S. PATENT DOCUMENTS 4,110,386  8/1978  Yajima et al. ................... 528/35
4,117,057  9/1978  Yajima et al. ................... 528/35
4,122,139  10/1978 Yajima et al. ................... 528/35
4,134,759  1/1979  Yajima et al. ................... 528/35
4,147,538  4/1979  Yajima et al. ................... 528/35

Primary Examiner—Melvyn I. Marquis
Attorney, Agent, or Firm—Toren, McGeady and Goldberg

[57] ABSTRACT

The precursor composition of silicon carbide fibers provided by the invention has greatly improved spinnability and can be spun at a very high spinning velocity to give a green filament which has a much larger tensile strength than those of conventional precursor materials and is capable of giving silicon carbide fibers having increased tensile strength by the infusibilization and calcination of the green filament of the composition under tension. The composition comprises from 80 to 99.9 parts by weight of a polycarbosilane polymer and from 20 to 0.01 part by weight of a silmethylene polymer having a degree of polymerization larger than the specified lower limit.

4 Claims, No Drawings

PRECURSOR COMPOSITION OF SILICON CARBIDE

BACKGROUND OF THE INVENTION

The present invention relates to a precursor composition of silicon carbide or, more particularly, to a composition useful as a precursor of silicon carbide fibers having improved spinnability into filaments with a remarkably increased tensile strength suitable for infusibilization and calcination under tension.

In recent years, various kinds of high-performance ceramic materials are highlighted in respect of their excellent mechanical strength and heat resistance, of which silicon carbide belongs to a class of the most important ones. Silicon carbide is, however, workable with extreme difficulties due to the very high hardness thereof so that various methods of fabrication have been proposed and developed depending on the forms of the desired shaped articles of silicon carbide including the sintering method of fine silicon carbide powders, vapor-phase growing method, liquid-phase growing method, method of using an organosilicon compound as a precursor and the like. When the desired silicon carbide article is in the form of fibers, an advantageous method generally undertaken for the preparation thereof is to spin an organosilicon compound as a precursor into a filament which is infusibilized and calcined at a high temperature into a fiber of inorganic nature composed of silicon carbide.

A class of the organosilicon compounds most widely used as a precursor of silicon carbide fibers includes various kinds of polycarbosilane compounds disclosed in, for example, Japanese Patent Publication Nos. 55-49621 and 57-26527 and Japanese Patent Kokai Nos. 56-74126, 57-56566 and 58-67730. These polycarbosilane compounds are spinnable into a filament which is converted into a silicon carbide fiber by the infusibilization and calcination at high temperatures. The green filament obtained by spinning the polycarbosilane, however, has a very low tensile strength of only about 500 g/mm$^2$ and also is brittle and apt to be destroyed even by a very weak outer force to cause extreme difficulties in handling to reserve the filament form as such so that the polycarbosilanes are not free from great difficulties in continuous spinning and winding up of the green filament on a reel. In addition, green filaments of the polycarbosilanes cannot be subjected to the infusibilization treatment under tension so that no sufficient mechanical properties can be imparted to the silicon carbide fibers obtained therefrom.

SUMMARY OF THE INVENTION

An object of the present invention is therefore to provide a novel precursor composition of silicon carbide or, in particular, silicon carbide fibers having improved spinnability and freed from the disadvantage of fragility of green filaments prepared from conventional precursor materials.

Thus, the precursor composition of silicon carbide fibers provided by the present invention comprises: (a) from 80 to 99.9 parts by weight or, preferably, from 90 to 99.5 parts by weight of a polycarbosilane polymer obtained by heating an organosilicon compound having a skeleton of polysilane or a copolymer of the organosilicon compound and an organometallic compound obtained by heating a mixture thereof in an atmosphere of an inert gas to effect pyrolytic polycondensation reaction; and (b) from 0.1 to 20 parts by weight or, preferably, from 0.5 to 10 parts by weight of a polymeric organosilicon compound having a linear molecular structure represented by the general formula $$R^1\text{-}(SiR_2\text{---}CH_2)_m\text{H}, \qquad (I)$$

in which R is a monovalent hydrocarbon group, $R^1$ is a monovalent group selected from the class consisting of hydroxy, amino, monovalent hydrocarbon and trialkylsiloxy groups and m is a positive integer not smaller than 100.

DETAILED DESCRIPTION OF THE PREFERRED EMBODIMENTS

As is understood from the above given summarizing description, the essential components in the precursor composition of the invention are the components (a) and (b) defined above. Such a unique combination of the components has been discovered as a result of the extensive investigations undertaken by the inventors in an object to obtain a precursor composition of silicon carbide fibers free from the problems and disadvantages in the prior art precursor materials. Namely, the investigations have led to a conclusion that the green filament of conventional polycarbosilanes cannot have a sufficiently high mechanical strength because the polycarbosilanes usually have a small weight-average molecular weight of only about 2000 or up to 10,000 at the largest and a cyclic or three dimensional molecular configuration and that this problem may be solved by admixing the polycarbosilane with a polymeric compound having a two dimensional linear molecular structure. Their further investigations have established that the most remarkable improving effect can be obtained by admixing a polycarbosilane with an organosilicon compound having a linear polysilmethylene structure represented by the above given general formula (I).

The base component, i.e. component (a), in the inventive precursor composition is a polycarbosilane or a copolymer thereof with an organometallic compound known in the art. Such a polymeric material can be prepared by heating an organosilicon compound having a skeleton of polysilane or a mixture thereof with an organometallic compound in an atmosphere of an inert gas to effect the pyrolytic polycondensation reaction. The organosilicone compound having a skeleton of polysilane is composed of a kind or a combination of two kinds or more of the units expressed by the formulas

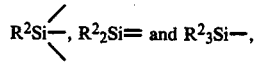

in which $R^2$ is a hydrogen atom or a monovalent hydrocarbon group selected from the class consisting of methyl, ethyl, vinyl and phenyl groups, and has a cyclic, straightly linear or branched molecular structure. Exemplary of such a polysilane compound are the cyclic or linear polysilane compounds obtained by the reaction of a diorgano dichlorosilane and metallic sodium, methyl polysilane compounds derived from methyl chlorodisilanes as a byproduct in the so-called direct synthesis of methyl chlorosilanes by the reaction of methyl chloride and metallic silicon (see, for example, Japanese Patent Publication No. 55-49621) and dimethyl polysilane compounds having a skeleton of diorganosilmethylene and/or diorganosilphenylene linkages (see, for example, Japanese Patent Kokai No. 58-67729). These polysilane compounds may be used either singly or as a mixture of two kinds or more according to need. When heated at a temperature of 300° to 650° C. in an atmosphere of an inert gas under normal pressure or superatmospheric pressure, the polysilane compound is converted into a polycarbosilane polymer by the pyrolytic polycondensation reaction (see, for example, Japanese Patent Publication No. 57-26527 and Japanese Patent Kokai No. 58-67730).

The above described organosilicon compound having a skeleton of polysilane linkages may be copolymerized with an organometallic or organometalloid compound containing boron, aluminum, titanium, zirconium and the like as the metallic or metalloid element when increased thermal stability is desired in the silicon carbide fibers. Several of the examples of suitable organometallic and organometalloid compounds include organoboron compounds formed of the units expressed by the formula $(-BR^3-NR^4-)$, in which $R^3$ is a monovalent hydrocarbon group such as alkyl, e.g. methyl, ethyl and propyl, groups, alkenyl, e.g. vinyl and allyl, groups and aryl, e.g. phenyl, groups, a trihydrocarbylsilyl-substituted alkyl group of the formula $-(CH_2)_nSiR^3{}_3$, $R^3$ having the meaning defined above and n being a positive integer, or a group of the formula $NR^5{}_2$, $R^5$ being a hydrogen atom or a group selected from the same group as the examples of $R^3$, and $R^4$ is a monovalent hydrocarbon group, phenyl borosiloxane compounds having a skeleton formed of the atoms of boron, silicon and oxygen and phenyl groups as the pendant groups on the silicon atoms (see, for example, Japanese Patent Kokai No. 53-42300) and metal alkoxide compounds represented by the general formula $M(OR^3)_4$, in which M is an atom of aluminum, titanium or zirconium and $R^3$ has the same meaning as defined above. The organometallic or organometalloid compound can be copolymerized with the polysilane compound by heating a mixture thereof at a temperature of 250° to 500° C. in an atmosphere of an inert gas under normal pressure or under a superatmospheric pressure to effect the pyrolytic polycondensation reaction.

The linearly polymeric organosilicon compound as the component (b) in the inventive composition has a large molecular weight and represented by the above given general formula (I), in which R is a monovalent hydrocarbon group selected from the class consisting of alkyl groups, e.g. methyl, ethyl and propyl groups, alkenyl groups, e.g. vinyl and allyl groups, and aryl groups, e.g. phenyl group, $R^1$ is a hydroxy group, amino group, monovalent hydrocarbon group exemplified by the same groups as the examples of R or trialkylsiloxy group and m is a positive interger not smaller than 100. Exemplary of such an organosilicon polymeric compound are poly(dimethyl silmethylene) of the formula $R^1-(SiMe_2-CH_2)_m-H$, poly(methylphenyl silmethylene) of the formula $R^1-(SiMePh-CH_2)_m-H$ and poly(diphenyl silmethylene) of the formula $R^1-(SiPh_2-CH_2)_m-H$, in which Me and Ph denote a methyl group and a phenyl group, respectively. These silmethylene polymers can be readily obtained by the ring-opening polymerization of a 1,3-disilacyclobutane with heating in a solvent or without solvent in the presence of chloroplatinic acid as a catalyst. The molecular weight of the polymer can be controlled by adjusting the amount of the catalyst used in the polymerization. The silmethylene polymer should have a weight-average molecular weight of at least 10,000 or, preferably, from 100,000 to 1,000,000. This limitation is given because no advantageous effect is obtained with a silmethylene polymer having a weight-average molecluar weight smaller than 10,000 while a silmethylene polymer having a weight-average molecular weight larger than 1,000,000 can be synthesized only with great difficulties.

The precursor composition of the invention for silicon carbide fibers is prepared by mixing the above described polycarbosilane polymer or a copolymer of a polysilane compound and an organometallic compound as the component (a) and the silmethylene polymer having a linear molecular structure as the component (b). As to the mixing ratio of these components, the inventive composition is composed of from 80 to 99.9 parts by weight or, preferably, from 90 to 99.5 parts by weight of the component (a) and from 0.1 to 20 parts by weight or, preferably, from 10 to 0.5 part by weight of the component (b). This is because no substantial effect can be obtained by combining the components when the amount of the component (b) is smaller than the above mentioned lower limit while a composition containing 20% by weight or more of the component (b) is disadvantageous due to the possible melting adhesion of the filaments with each other in the course of the infusibilization treatment following the spinning of the composition. The inventive composition is prepared by blending the components (a) and (b) each in a calculated and weighed amount and melting the blend by heating with thorough mixing or, alternatively, solutions of the components are mixed together with agitation followed by the removal of the solvent by distillation. Preferable solvents used in the latter process include hydrocarbons such as benzene, toluene, xylene, hexane and the like, ethers such as diethyl ether, tetrahydrofuran and the like and halogenated hydrocarbons such as methylene chloride, chloroform and the like.

The precursor composition of the invention can be spun into filaments by heating and melting the same into a spinning melt and spinning the melt using a suitable spinning apparatus. Alternatively, a spinning dope can be prepared by dissolving the composition in a solvent such as those named above and removing at least a part of the solvent to thicken the solution. By virtue of the greatly improved spinnability obtained by the admixture of the linear silmethylene polymer as the component (b) to the component (a), spinning of the inventive precursor composition can be performed at a much higher spinning velocity of up to 2000 meters/minute than in the spinning of a conventional precursor material which can be spun at a spinning velocity of only about 500 meters/minutes or lower. Moreover, the green filament of the inventive precursor composition obtained at such a high spinning velocity has a tensile strength of 2 to 6 kg/mm$^2$ which is also much larger than that of conventional green filaments having a tensile strength of about 500 g/mm$^2$ at the highest. Thus, the inventive precursor composition is advantageous in respect of the very high productivity in the spinning process into green filaments and the remarkably improved tensile strength of the green filaments.

The thus obtained green filament is then infusibilized by heating at a temperature in the range from 150° to 250° C. in an atmosphere containing oxygen or by irradiating with high-energy radiation, e.g. gamma-rays, followed by a calcination treatment at a high temperature in vacuum or in an atmosphere of an inert gas to be converted into inorganic silicon carbide fibers. The temperature of calcination should be in the range from 800° C. to 1500° C. because conversion of the green filament after infusibilization into an inorganic matter would be insufficient when the calcination temperature is lower than 800° C. while the silicon carbide fibers would have somewhat decreased mechanical strengths when calcined at a temperature higher than 1500° C. due to the growth of crystallites to a great extent.

It is known that the infusibilization and calcination of green filaments should preferably be performed under tension so as to impart the resultant silicon carbide fibers with an increased mechanical strength. In this regard, green filaments prepared from conventional precursor materials can be subjected to such a treatment only to an insufficient extent due to the poor tensile strength thereof rarely exceeding 500 g/mm$^2$ so that the silicon carbide fibers resultant therefrom have limited mechanical properties of 250 to 300 kg/mm$^2$ of the tensile strength and 18 to 20 tons/mm$^2$ of elastic modulus. In contrast thereto, the green filaments obtained from the inventive precursor composition have a tensile strength of 2 to 6 kg/mm$^2$ so that the infusibilization and calcination can be performed under tension of up to 2000 g/mm$^2$ to give silicon carbide fibers having a tensile strength of 300 to 350 kg/mm$^2$ and an elastic modulus of 25 to 30 tons/mm$^2$.

In the following, the precursor composition of the invention is described in more detail along with preparation of silicon carbide fibers therefrom by way of examples.

EXAMPLE 1

A pyrolytic polycondensation reaction was performed by heating 52 g of a polysilane, which was a reaction product of 129 g of dimethyl dichlorosilane and 48 g of metallic sodium in toluene, at 400° C. for 48 hours under pressurization in an autoclave to give 33 g of a polycarbosilane.

Separately, 20 g of 1,1,3,3-tetramethyl-1,3-disilacyclobutane and 0.1 g of a 20% solution of chloroplatinic acid in 2-ethylhexyl alcohol were introduced into a flask of 100 ml capacity and the mixture was heated at 60° to 70° C. so that an exothermic reaction took place to increase the temperature of the mixture to about 200° C. where the mixture was kept for 2 hours followed by cooling. The thus obtained reaction mixture was dissolved in 50 ml of n-hexane and the solution was filtered. The filtrate solution was poured into 200 ml of ethyl alcohol and the precipitates were collected and dried to give 19.5 g of a white gum-like solid which was identified to be a poly(dimethyl silmethylene) having a weight-average molecular weight of $4.4 \times 10^5$ as determined by the methods of GPC and NMR.

In the next place, 1 g of this poly(dimethyl silmethylene) and 30 g of the polycarbosilane prepared in the above described manner were dissolved in 100 ml of tetrahydrofuran with agitation followed by the removal of the solvent from the solution by distillation first under normal pressure and then under reduced pressure. The residual composition was subjected to melt spinning at a spinning velocity of 1000 meters/minute to give a green filament having an average diameter of 10 μm and a tensile strength of 2.2 kg/mm$^2$.

The green filament was infusibilized by heating in air at 180° C. for 2 hours after temperature elevation from room temperature to 180° C. at a rate of 10° C./hour and then calcined under a tension of 1 kg/mm$^2$ by heating in vacuum at 1000° C. for 2 hours after temperature elevation from room temperature to 1000° C. taking 10 hours to give black fibers which could be identified to be composed of β-SiC by the X-ray diffractometry. The thus obtained silicon carbide fibers had a tensile strength of 340 kg/mm$^2$.

EXAMPLE 2

Another poly(dimethyl silmethylene) was prepared in the same manner as in Example 1 excepting decrease of the amount of the added catalyst solution of chloroplatinic acid to 0.03 g. The poly(dimethyl silmethylene) had a weight-average molecular weight of $7.2 \times 10^5$.

A precursor composition for spinning was prepared by dissolving 0.3 g of the above prepared poly(dimethyl silmethylene) and the same polycarbosilane as prepared and used in Example 1 in tetrahydrofuran followed by the same procedure as in Example 1 to give a green filament having an average diameter of 9 μm and a tensile strength of 3.4 kg/mm$^2$. The green filament was then infusibilized and calcined in the same manner as in Example 1 excepting the increase of the tension in the calcination to 1.5 kg/mm$^2$ to give a silicon carbide fiber having a tensile strength of 350 kg/mm$^2$.

COMPARATIVE EXAMPLE

The same polycarbosilane as prepared and used in Example 1 was subjected to the same treatment and melt-spinning as in Example 1 without addition of the poly(diemthyl silmethylene). The spinning velocity in this case could not be increased to exceed 500 meters/minute and the green filament under spinning was frequently broken when the spinning velocity was increased to exceed 500 meters/minutes. Accordingly, the melt-spinning was performed at a velocity of 400 meters/minute to give a green filament having an average diameter of 15 μm having a tensile strength of 380 g/mm$^2$. The green filament was infusibilized and calcined in the same manner as in Example 1 excepting the decrease of the tension in the calcination to 200 g/mm$^2$ to give a silicon carbide fiber having a tensile strength of 280 kg/mm$^2$.

EXAMPLE 3

A poly(borodiphenyl siloxane) was prepared by heating a mixture of diphenyl dichlorosilane and boric acid in a molar ratio of 1:1 in n-butyl ether under an atmosphere of nitrogen gas at 100° to 120° C. for 1 hour followed by removal of the solvent by heating the mixture under reduced presure up to 400° C. and further heating of the residue at the same temperature in vacuum for 1 hour.

A polycarbosilane was prepared by heating a mixture of 2 g of the above obtained poly(borodiphenyl siloxane) and 100 g of a polysilane prepared in the same manner as in Example 1 at 350° C. for 6 hours in a stream of nitrogen gas under normal pressure to give 60 g of the product.

A precursor composition composed of 30 g of the above prepared polycarbosilane and 1 g of the same poly(dimethyl silmethylene) as prepared and used in Example 1 was dissolved in tetrahydrofuran and processed in the same manner as in Example 1 including the steps of melt-spinning, infusibilization and calcination to give a silicon carbide fiber having an average fiber diameter of 10 μm, tensile strength of 330 kg/mm² and elastic modulus of 25 tons/mm².

EXAMPLE 4

A titanium-containing organometallic copolymer was prepared by heating a mixture of 20 g of the polycarbosilane obtained in Example 3 and 15 g of titanium tetrabutoxide at 300° C. for 1 hour.

A precursor composition prepared by dissolving 30 g of the above prepared titanium-containing copolymer and 1 g of the same poly(dimethyl silmethylene) as prepared and used in Example 1 in tetrahydrofuran followed by the same processing was subjected to melt-spinning, infusibilization and calcination in the same manner as in Example 1 to give a silicon carbide fiber having an average fiber diameter of 9 μm and tensile strength of 340 kg/mm².

EXAMPLE 5

A zirconium-containing organometallic copolymer was prepared in the same manner as in Example 4 by replacing the titanium tetrabutoxide with zirconium tetrabutoxide. Silicon carbide fibers were prepared from 30 g of this zirconium-containing organometallic copolymer and 1 g of the poly(dimethyl silmethylene) prepared and used in Example 1 in the same manner as in Example 1 including the steps of melt-spinning, infusibilization and calcination. The silicon carbide fiber had an average fiber diameter of 9 μm and tensile strength of 320 kg/mm².

EXAMPLE 6

A polysilane having a skeleton of dimethyl silmethylene was prepared by adding a mixture of 116 g of dimethyl dichlorosilane and 14.3 g of chloromethyl dimethyl chlorosilane dropwise into a dispersion of 46 g of metallic sodium in xylene to give 62 g of the product. A polycarbosilane was prepared in the same manner as in Example 1 by using the above prepared polysilane.

Silicon carbide fibers were prepared from 30 g of the above obtained polycarbosilane and 1 g of the same poly(dimethyl silmethylene) as prepared and used in Example 1 in the same manner as in Example 1. The silicon carbide fiber had an average fiber diameter of 10 μm and tensile strength of 320 kg/mm².

EXAMPLE 7

A polycarbosilane was prepared by heating a mixture of 100 g of a polysilane prepared in the same manner as in Example 1 and 3 g of 1,3,5-trimethyl-2,4,6-triphenyl borazine at 350° C. for 20 hours in a stream of nitrogen gas under normal pressure to give 65 g of the product. Silicon carbide fibers were prepared from 30 g of the thus obtained polycarbosilane and 0.3 g of the same poly(dimethyl silmethylene) as prepared and used in Example 2 in the same manner as in Example 2 including the steps of melt-spinning, infusibilization and calcination. The silicon carbide fiber had an average fiber diameter of 10 μm and tensile strength of 340 kg/mm².

What is claimed is:

1. A precursor composition of silicon carbide which comprises:
   (a) from 80 to 99.9% by weight of a polycarbosilane polymer having a three-dimensional molecular structure obtained by heating at a temperature of 300°–650° C. in an atmosphere of an inert gas, a polysilane compound composed of one or a combination of one or more units selected from the group consisting of

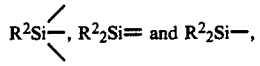

in which $R^2$ is a hydrogen atom or a monovalent hydrocarbon group selected from the class consisting of methyl, ethyl, vinyl and phenyl groups, or, a copolymer of said polysilane compound, and an organometallic compound containing a metal atom selected from the group consisting of boron, aluminum, titanium and zirconium, to effect pyrolytic polycondensation reaction, and
   (b) from 0.1 to 20 parts by weight of a polymeric organosilicon compound having a linear molecular structure represented by the general formula

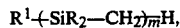

in which R is a monovalent hydrocarbon group, $R^1$ is a monovalent group selected from the class consisting of hydroxy, amino, monovalent hydrocarbon and trialkylsiloxy groups and m is a positive integer not smaller than 100.

2. The precursor composition of silicon carbide as claimed in claim 1 wherein the organometallic compound is an organoboron compound composed of the units represented by the general formula (—B$R^3$—N$R^4$—), in which $R^3$ and $R^4$ are each a monovalent hydrocarbon group.

3. The precursor composition of silicon carbide as claimed in claim 2 wherein the organoboron compound is 1,3,5-trimethyl-2,4,6-triphenyl borazine.

4. The precursor composition of silicon carbide as claimed in claim 1 wherein the organometallic compound is a compound represented by the general formula M(O$R^3$)$_4$, in which M is an atom of a metal selected from the group consisting of aluminum, titanium and zirconium and $R^3$ is a monovalent hydrocarbon group.